US009470386B2

(12) United States Patent
Kloos

(10) Patent No.: US 9,470,386 B2
(45) Date of Patent: Oct. 18, 2016

(54) HEADLIGHTS FOR VEHICLES

(71) Applicant: Hella KGaA Hueck & Co., Lippstadt (DE)

(72) Inventor: Gerhard Kloos, Erwitte (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/414,059

(22) PCT Filed: Jun. 29, 2013

(86) PCT No.: PCT/EP2013/063758
§ 371 (c)(1),
(2) Date: Jan. 9, 2015

(87) PCT Pub. No.: WO2014/012773
PCT Pub. Date: Jan. 23, 2014

(65) Prior Publication Data
US 2015/0330589 A1    Nov. 19, 2015

(30) Foreign Application Priority Data

Jul. 18, 2012   (DE) .................. 10 2012 106 490

(51) Int. Cl.
*F21S 8/10* (2006.01)
*F21Y 101/02* (2006.01)

(52) U.S. Cl.
CPC ........ *F21S 48/1154* (2013.01); *F21S 48/1258* (2013.01); *F21S 48/1747* (2013.01); *B60Q 2300/056* (2013.01); *F21Y 2101/02* (2013.01)

(58) Field of Classification Search
CPC ............. F21S 48/1258; F21S 48/1154; F21S 48/1747; B60Q 2300/056; F21V 5/008; F21V 5/08; F21V 5/048; F21V 5/046; G02B 3/0006; F21Y 2101/02
USPC ........................................................ 362/268
See application file for complete search history.

(56) References Cited

U.S. PATENT DOCUMENTS

2002/0196639 A1* 12/2002 Weidel ................ F21S 48/1154
362/521
2013/0003402 A1* 1/2013 Chao ................... F21S 48/1258
362/520

FOREIGN PATENT DOCUMENTS

| DE | 102005030932 A1 | 1/2007 |
| DE | 102008005488 A1 | 7/2009 |
| DE | 102008027320 A1 | 12/2009 |
| DE | 102009053581 B3 | 3/2011 |
| DE | 102010047697 A1 | 4/2012 |
| DE | 102011054233 A1 | 4/2013 |

(Continued)

Primary Examiner — Y M Lee
(74) Attorney, Agent, or Firm — Husch Blackwell LLP

(57) ABSTRACT

A headlight for vehicles with a plurality of LED light sources that are arranged in a matrix in an LED array, each emitting a partial light beam that falls on an optical unit, located in the front, in the main beam direction in order to image light spots that combine to form a predetermined light distribution, whereby the optical unit comprises a first lens element and a rotationally symmetrically arranged second lens element, by means of which the partial light beams are transformed so that imaged light spots that are adjacent in the light distribution are directly adjacent or overlap, wherein the first lens element (4) is shaped in such a way that light spots of the light distribution in the vertical direction have a greater separation than in the horizontal direction.

10 Claims, 1 Drawing Sheet

(56) References Cited

FOREIGN PATENT DOCUMENTS

| EP | 1980787 | A1 | 10/2008 |
| EP | 2280215 | A2 | 2/2011 |
| JP | 05266701 | A | 10/1993 |

\* cited by examiner

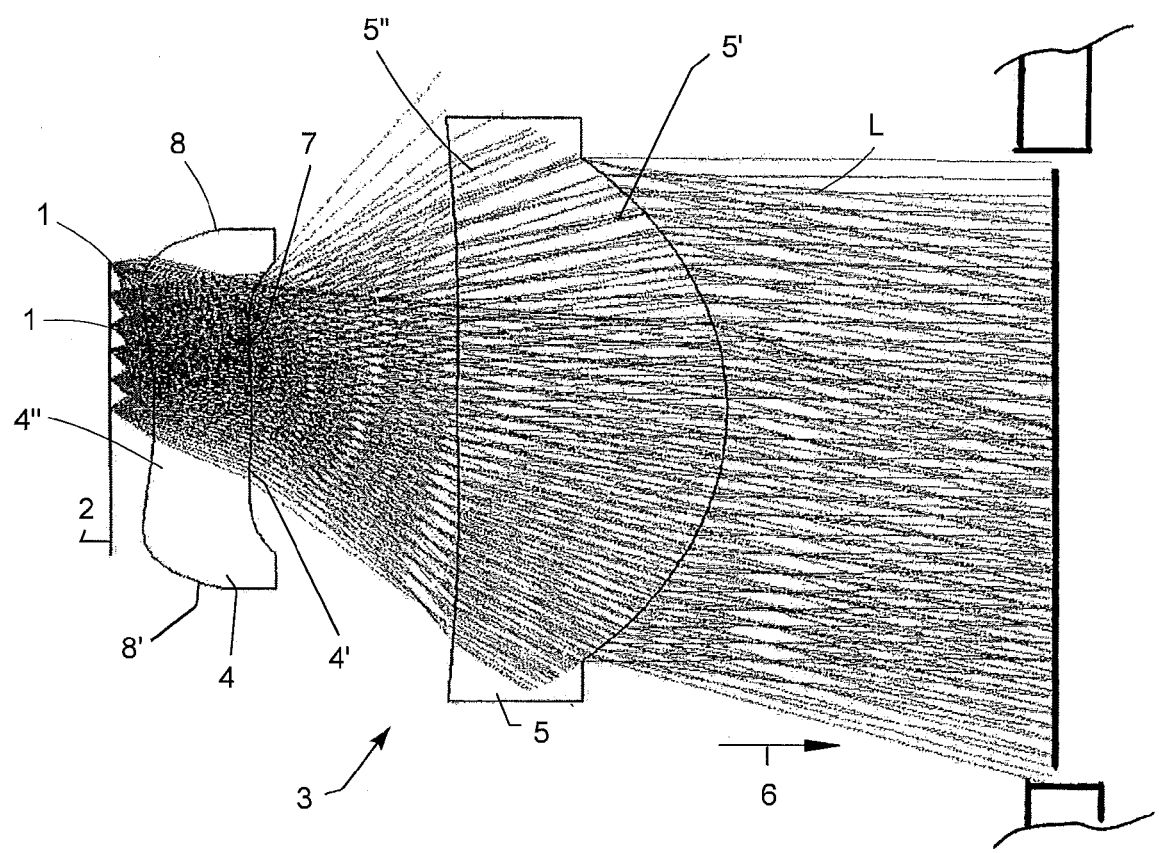

HEADLIGHTS FOR VEHICLES

CROSS REFERENCE

This application claims priority to PCT/EP2013/063758, filed Jun. 29, 2013, which itself claims priority to German Application No. 10 2012 106490.3, filed Jul. 18, 2012, which are both hereby incorporated by reference.

FIELD OF TECHNOLOGY

The invention relates to a headlight for vehicles with a plurality of LED light sources that are arranged in a matrix in an LED array, each emitting a partial light beam that falls on an optical unit, located in the front, in the main beam direction in order to image light spots that combine to form a predetermined light distribution, whereby the optical unit comprises a first lens element and a rotationally symmetrically arranged second lens element, by means of which the partial light beams are transformed so that imaged light spots that are adjacent in the light distribution are directly adjacent or overlap.

BACKGROUND

DE 10 2008 027 320 A1 discloses a headlight for vehicles that comprises a plurality of LED light sources which are arranged like a matrix in an LED array. The LED array is preceded by an optical unit having a first lens element and a second lens element, so that a high beam distribution can be created. In addition, a control unit is provided which controls the LED light sources in such a way that, depending on the current traffic situation, either a full upper-beam light distribution or a partial upper-beam light distribution is produced. In the full upper-beam light distribution, a maximum number of LED light sources is turned on, illuminating the road area where no other traffic object is located. In the partial upper-beam light distribution, a reduced number of LED light sources is turned on so that not the entire traffic space is illuminated, but only a traffic area reduced by a dimmed area. In the dimmed area this light distribution a transport object is located, such as a preceding vehicle or an oncoming vehicle that is not blinded. The known headlight thus provides an "addressable" high-beam function, allowing optimum dimming of other road objects. The light distribution is made up of a plurality of light spots which are obtained by imaging the LED light sources by means of the lens elements of the optical unit. The first lens element as well as the second lens element are designed rotationally symmetrical and coordinated so that adjacent light spots of the light distribution are directly adjacent with one another or are overlapping. The first lens element and second lens element are designed so that the light spots in the vertical and in the horizontal direction have the same separation, i.e., the light spots on a measuring screen each generate a square light shape. A disadvantage of the known headlight is that light spots imaged on a measuring screen are not rod-shaped, which would lead to a distribution of light with different principal directions. For example, as a result of shape, or position changes of the first lens element and the second lens element, the light spots or individual images of the LED light sources can be noticeably "softened" in a general direction. However, this also changes the color correction of the headlight, i.e., the spherical aberration, coma, astigmatism, field curvature and chromatic aberration is impaired. If the creation of different main directions in the light distribution is caused by an additional optical element, additional problems with respect to position and shape tolerances and calibration can occur. Furthermore, this makes the production of the headlight relatively complex.

SUMMARY OF THE INVENTION

It is therefore an object of the present invention to develop a headlight for vehicles such that light distribution with different principal directions can be generated in a simple way.

The invention enables the provision of a light distribution, which is composed of light spots, each comprising a different luminance distribution in different and perpendicular directions. Advantageously, a robust headlight is provided in which the optical unit converts the partial light bundle of the LED light sources with a relatively low proportion of high divergence angles. The beams of the partial light beams are deflected only as far as necessary. Furthermore, color effects commonly occurring in lens matrix headlights can be minimized. The generated light distribution or the imaged spots shown have two different principal directions, ensuring that locally targeted light bundling. In particular, this can achieve dimming of dynamically changing traffic objects in front of the vehicle without creating a high-contrast transition between the dimmed area and the lit area.

According to a preferred embodiment of the invention, the first lens element and/or the second lens element are designed such that a separation of the light spots is preferably 5° in the vertical direction and less than 1.2°, more particularly 1°, in the horizontal direction. Advantageously, this can achieve fine horizontal scaling while good continuity is achieved in the front of the vehicle in the vertical direction.

According to another embodiment of the invention, the first lens element, preferably the lens element close to the light source, is kidney-shaped in the horizontal cross section. The front of the first lens element, arranged in the front of a principal beam direction, has a groove extending in the horizontal direction, which is recessed with respect to the upper and lower edges. Advantageously, this can achieve a correction of the LED light sources in two different principal directions.

According to another embodiment, the first lens element is shaped concave on the reverse side. As a result, the first lens element is relatively easy to manufacture.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a top view of the headlight according to the invention, with light beams indicated.

DETAILED DESCRIPTION OF THE DRAWINGS

A headlight for vehicles can be used, for example, to generate a high-beam distribution. Preferably, the headlight is used to generate a dynamic beam distribution, whereby individual LED light sources 1 are switched on or off depending on the traffic situation. If a maximum number of LED light sources 1 is switched to the on state by means of a control unit (not shown), a full upper-beam light distribution can be generated, wherein the LED light sources 1 are imaged to create light spots that fully illuminate the traffic space. If there is a transport object, such as a preceding or an oncoming vehicle in the front of the vehicle, LED light sources 1 are switched on or off depending on the changes in the current location of this traffic object, as detected by a detection unit, so that only a partial upper-beam light distribution is generated. This distribution has a dimmed area that is not lit where the other traffic object is located. This prevents undesired blinding of the traffic object ahead.

In order to produce such a full upper-beam light distribution or partial upper-beam light distribution or upper-beam light distribution, the headlight includes an optical unit 3, which is formed by a first lens element 4 and a second lens element 5, in addition to the LED light sources 1 located in an LED array 2. By means of the first lens element 4 and the second lens element 5, the light of light beam L, emitted by the LED array 2, is shaped so that the desired upper-beam distribution is achieved.

The LED array 2 comprises a horizontally extending support plate, which extends horizontally along a width. The first lens element 4, which is formed asymmetrically, is located in the principal beam direction 6 of the LED array 2 in front of the LED light sources 1. The rotationally symmetrical second lens element 5 is located in front of the first lens element 4 in the main beam direction 6. The LED array 2 together with the optical unit 3 forms a component having a horizontal length. The horizontal width of the LED array 2 in this case is greater than one quarter of the horizontal length of the optical unit 3.

The second lens element 5 is shaped approximately plano-convex, wherein a front 5', located in front side in the a main beam direction 6, is approximately convex and an opposing back side 5' is approximately plane. The second lens element 5 has a transverse extent of, which is greater than a transverse dimension of the first lens element 4.

The first lens element 4 is kidney shaped in the horizontal cross-section. The first lens element 4 has a front side 4', located in the front in the principal beam direction 6, which has a groove 7 extending in the horizontal direction. This groove 7 forms a recess with respect to a horizontally extending top edge 8 and a horizontally extending lower edge 8' of the first lens element 4. A back side 4" of the first lens element 4, which is opposed to the front side 4' and faces the LED array 2 is formed, has a concave shape. In the present embodiment, the back side 4" of the first lens element 4 has a radius of curvature in the range of 80 mm to 120 mm, and the groove 7 has a radius of curvature in the range of 40 mm to 60 mm in a region adjacent to the edges 8, 8'.

The design of the first lens element 4 images the LED light sources 1 into light spots, which have a different separation in the horizontal direction and in the vertical direction. In the vertical direction, the separation is greater than in the horizontal direction. The separation in the vertical direction is at least 5°, preferably exactly 5°. The separation in the horizontal direction is less than 1.2°, in particular 1°. This allows for a more accurate channel separation in the horizontal direction, while the channel separation is coarser in the vertical direction. A Fourier transformation takes place, wherein the local distribution in the focal plane is converted into an angular distribution.

The light distribution is comprised of light spots, wherein adjacent light spots in the horizontal direction are directly adjacent to each other or overlap.

According to an alternative embodiment of the invention (not shown), the second lens element 5 can be asymmetrical and the first lens element 4 can be rotationally symmetric in order to achieve the desired upper-beam distribution with differently arranged principal directions.

REFERENCE NUMBER LIST

1 LED light sources
2 LED array
3 Optical unit
4, 4', first lens element
4"
5, 5', second lens element
5"
6 Principal beam direction
7 Groove
8, 8' top edge, bottom edge
L Beam of light

The invention claimed is:

1. A headlight for vehicles comprising:
an optical unit;
a plurality of LED light sources that are arranged in a matrix in an LED array, each said LED light source emitting a partial light beam that falls on the optical unit, said optical unit located in front of the LED array in order to combine the partial light beams from the LED light sources to form a predetermined light distribution,
whereby the optical unit comprises a first lens element and a separate rotationally symmetrically arranged second lens element, said first and second lens elements transforming the partial light beams so that partial light beams that are adjacent in the light distribution are directly adjacent or overlap,
wherein the first lens element is shaped in such a way that partial light beams of the light distribution in the vertical direction have a greater separation than in the horizontal direction.

2. The headlight according to claim 1, wherein the first lens element and/or the second lens element are designed in such a way that the separation of the light spots is at least 5° in the vertical direction and is less than 1.2° in the horizontal direction.

3. The headlight according to claim 1 wherein at least one of the first lens element and the second lens element are designed in such a way that the separation of the light spots is at least 5° in the vertical direction and is 1° in the horizontal direction.

4. The headlight according to claim 1 wherein the first lens element is symmetrical with respect to a horizontal median plane (MH).

5. The headlight according to claim 1 wherein the second lens element is approximately shaped plano-convex.

6. The headlight according to claim 1 wherein the first lens element has a transverse dimension, which is smaller than a transverse dimension of the second lens element.

7. The headlight according to claim 1 wherein the LED array has a horizontal width which is greater than one quarter of the horizontal length of the structural component formed by the LED array and the optical unit.

8. The headlight according to claim 1 wherein a control unit for controlling the LED light sources is provided, so that, in response to a change in the traffic conditions detected by a detecting unit, either a maximum number of LED light sources is switched on in order to generate a full-beam distribution or a reduced number of LED light sources is switched on to generate a partial beam distribution containing a dimmed area in the area where another transport object is located.

9. A headlight for vehicles comprising:

an optical unit;

a plurality of LED light sources that are arranged in a matrix in an LED array, each said LED light source emitting a partial light beam that falls on the optical unit, said optical unit located in front of the LED array in order to combine the partial light beams from the LED light sources to form a predetermined light distribution, whereby the optical unit comprises a first lens element and a separate rotationally symmetrically arranged second lens element, said first and second lens elements transforming the partial light beams so that partial light beams that are adjacent in the light distribution are directly adjacent or overlap, wherein the first lens element is a way ht beams of the distribution in the vertical direction have a greater separation than in the horizontal direction; and wherein the first lens element is formed kidney-shaped in horizontal cross-section, and wherein a front side of the first lens element includes a horizontal groove.

10. A headlight for vehicles comprising:

an optical unit;

a plurality of LED light sources that are arranged in a matrix in an LED array, each said LED light source emitting a partial light beam that falls on the optical unit, said optical unit located in front of the LED array in order to combine the partial light beams from the LED light sources to form a predetermined light distribution, whereby the optical unit comprises a first lens element and a separate rotationally symmetrically arranged second lens element, said first and second lens elements transforming the partial light beams so that partial light beams that are adjacent in the light distribution are directly adjacent or overlap, wherein the first lens element is shaped in such a way that partial light beams of the light distribution in the vertical direction have a greater separation than in the horizontal direction; and wherein the first lens element has a rear side which is shaped concave.

* * * * *